Feb. 18, 1930.  R. P. HOWARD  1,747,584
FIRE HOSE
Filed Aug. 31, 1926

Inventor
RUSSELL P. HOWARD

By
Attorneys.

Patented Feb. 18, 1930

1,747,584

UNITED STATES PATENT OFFICE

RUSSELL P. HOWARD, OF OAKLAND, CALIFORNIA

FIRE HOSE

Application filed August 31, 1926. Serial No. 132,784.

The present invention relates to improvements in hose construction, and has particular reference to what is commonly termed "fire hose".

The general object of the invention is the provision of a fire hose characterized by having properties of high resistance to attenuation, torsion and low resistance to water flowing therethrough while in use in connection with conveying water under high pressure.

The invention further proposes a fire hose reinforced against permanent creasing which results in rapid deterioration due to cracking while the hose is not in use and arranged within a hose wagon.

The invention still further proposes to reinforce against wear those portions of a fire hose that are exposed to rubbing while the hose is stored within a hose wagon or being drawn over the ground.

The above and other objects are accomplished by instrumentalities pointed out in the following specification.

The invention is clearly defined in the claim.

Figure 1:
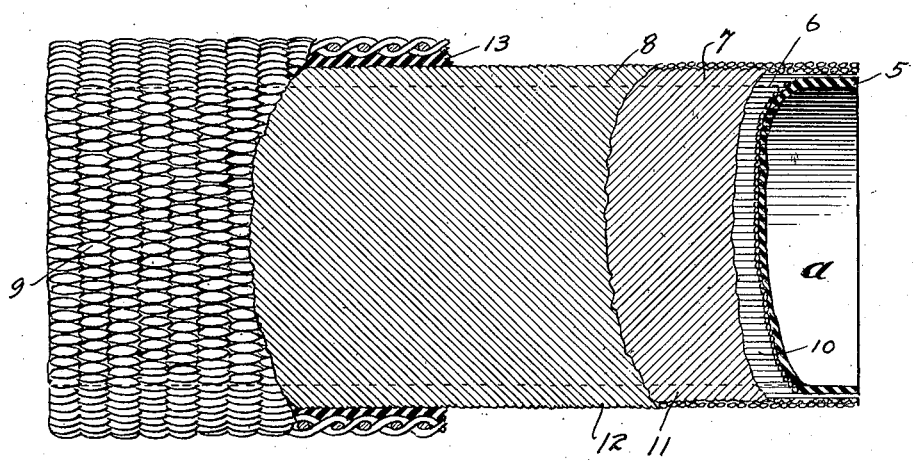

A satisfactory embodiment of the invention is illustrated in the accompanying drawings forming part of the specification and in which Figure 1 is a plan view of a fragment of a hose constructed in accordance with my invention, with parts thereof broken away to disclose the construction and relation of other parts.

Figure 2:
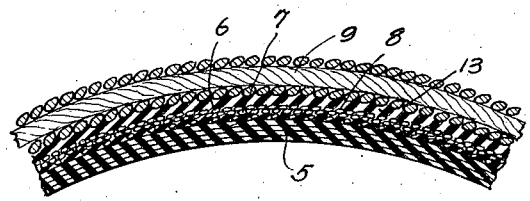
Figure 3:
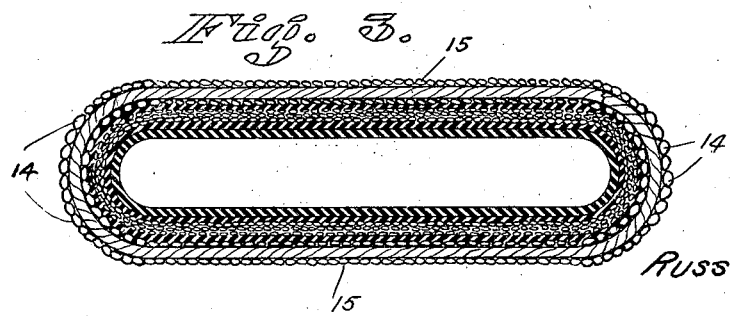

Figure 2 is an enlarged cross-sectional detail of a segment of the hose shown in Figure 1, and Figure 3 is a detail cross-section of the hose.

The hose a of the present invention comprises an inner tube 5 of rubber and a plurality of plies of cord fabric superimposed one upon the other and surrounding the tube 5. The plies are respectively designated by 6, 7 and 8, the outer ply 8 being surrounded by a tube of woven fabric 9. The inner tube 5 is formed of sheet rubber wound around a mandrel for a sufficient number of turns to provide a tube of the required thickness. The inner ply 6 is arranged so that strands 10 thereof extend longitudinally of the tube 5. The intermediate ply 7 is formed of material corresponding to the ply 6 and is wound around the inner ply so that the strands 11 thereof are disposed obliquely with respect to the strands 6. The outer ply 8 is wound spirally around the intermediate ply 11 but is disposed so that the strands 12 thereof extend obliquely to the strands 11 and 10 of the plies 7 and 6. The strands 10, 11 and 12 of the plies 6, 7 and 8 are frictioned and a coating of friction 13 is applied to the outer ply 8 preparatory to the removal of the tube from the mandrel. After the built-up structure made up of the tube and plies is removed from the mandrel, the same is inserted through the tube of woven fabric 9 whereupon the hose thus formed is subjected to an internal pressure by admitting steam under pressure thereinto with any form of well-known apparatus used for this purpose.

The action of the high pressure steam within the hose has the effect of forcing the tube 5, the plies 6, 7 and 8 and the tube of woven fabric 9 into close contact with one another and fixedly securing these parts one to the other by the heat of vulcanization had from the heated steam. Only partial vulcanization is obtained from the heat of the steam within the hose, and subsequent to the removal of the hose from the action of the steam, the hose is placed in an ordinary vulcanizer used for this purpose and vulcanization is completed therein. In the operation of final vulcanization a suitable form is inserted through the tube 5, the said form being relatively thin and flat with rounded edges and of a size to cause the hose to assume a flattened, oblong shape, as shown in Figure 3.

In Figure 3 it will be noted that the longitudinal strands 14 of the woven fabric tube 9 are thicker on the opposite sides of the flattened tube than the corresponding intermediate strands 15. The presence of these thickened strands on the sides of the hose provide a reinforcement against rapid wear in that they provide bearing surfaces for the hose when the same is arranged edgewise in a hose wagon and when the hose is drawn upon the ground in the act of making connection with a fire plug or the like.

The presence of the longitudinally extending strands 10 of the inner ply 6 has the effect of eliminating transverse corrugations which invariably appear on the inner surface of the tube of fire hose as now constructed, and in lieu thereof tend to provide longitudinal corrugations, the provision of which offers less resistance to the flow of water through the tube and results in nozzle pressure increased over and above that which is had when transverse corrugations are present. The longitudinally extending strands 10 also retard and in a great measure prevent longitudinal extension or attenuation of the hose under the pressure of water within while the hose is in use. The disposition of the strands 11 and 12 of the plies 7 and 8 cooperates to prevent undue transverse expansion of the hose under pressure and further prevents torsion of the hose body in either direction. In that the tube of woven fabric is fixedly secured to the hose body, independent creeping of the parts under contraction after the removal of high pressure water within, is prevented, it being obvious that when the hose body is attenuated by high pressure from within, the several parts thereof will attenuate simultaneously and a like action will be had when the internal pressure is removed, owing to the parts being rigidly connected together. In this way puckering or gathering on the part of the woven fabric tube which has taken place in fire hose heretofore constructed, is prevented.

It will further be noted that the structure provided by connecting the several parts of the hose one to the other prevents creasing of the hose body when the same is folded and arranged in a hose wagon or the like, it being obvious that the disposition of the strands of the plies, together with the securing of the parts one to the other, operates to cause the hose to extend on a curved line at the point of folding, as distinguished from a sharp crease, which would result if the structure of the present invention were not employed.

Although I have shown and described one embodiment of my invention, it is to be understood that the same is susceptible of various changes; and I reserve the right to employ such as may come within the scope of the appended claim.

I claim:

A collapsible fire hose comprising a flexible rubber tube, a ply of longitudinal cords surrounding the same, two additional plies of cords surrounding the first ply and running diagonally thereto and intersecting one another, a woven fabric surrounding the plies and reinforced along diametrically opposed longitudinal lines, the plies being frictioned with rubber and all the parts being vulcanized into one unitary structure.

RUSSELL P. HOWARD.